United States Patent
Wilt et al.

(10) Patent No.: US 6,393,363 B1
(45) Date of Patent: May 21, 2002

(54) METHOD AND APPARATUS FOR THE MEASUREMENT OF THE ELECTRICAL RESISTIVITY OF GEOLOGIC FORMATIONS EMPLOYING MODELING DATA

(75) Inventors: Michael Wilt, Walnut Creek; Edward Nichols, Berkeley, both of CA (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/719,788
(22) PCT Filed: Jun. 28, 2000
(86) PCT No.: PCT/US00/17695
§ 371 Date: Dec. 15, 2000
§ 102(e) Date: Dec. 15, 2000
(87) PCT Pub. No.: WO02/01253
PCT Pub. Date: Jan. 3, 2002

(51) Int. Cl.[7] .............................................. G06F 19/00
(52) U.S. Cl. ........................................ 702/6; 324/323
(58) Field of Search ...................... 702/6, 7; 73/152.01; 367/27, 49; 324/334, 339, 323

(56) References Cited

U.S. PATENT DOCUMENTS

| | | | | | |
|---|---|---|---|---|---|
| 4,875,015 | A | * | 10/1989 | Ward | .......................... 324/323 |
| 5,886,255 | A | * | 3/1999 | Aronstam | ................ 73/152.01 |
| 5,955,884 | A | * | 9/1999 | Payton et al. | ................ 324/339 |
| 6,088,655 | A | * | 6/2000 | Daily et al. | ..................... 702/7 |

OTHER PUBLICATIONS

Augustin, Kennedy, Morrison & Lee, "A Theoretical Study of Surfact–to–Borehole Electromagnetic Logging in Cased Holes," *Geophysics*, vol. 54, No. 1, pp. 90–99 (Jan. 1989).

Zhou, Becker & Morrison, "Audio–Frequency Electromagnetic Tomography in 2–D," *Geophysics*, vol. 58, No. 4, pp. 482–495 (Apr. 1993).

(List continued on next page.)

*Primary Examiner*—Edward Lefkowitz
*Assistant Examiner*—Victor J. Taylor
(74) *Attorney, Agent, or Firm*—John J. Ryberg; Victor H. Segura (57) ABSTRACT

Provided are a method, a computer program product and a system, to measure characteristics of a geologic formation, such as hydrocarbon reservoirs, that employs modeling data to remove unwanted information from a signal carrying information concerning the geologic formation. This allows obtaining accurate information concerning the resistivity of geologic formations in which a borehole has been formed and encased with a conductive liner, such as a steel casing. Specifically, it was recognized that a magnetic field produced within a borehole that has been cased is substantially similar to magnetic field produced from a borehole that was not cased, i.e., the spatial distribution and orientation to the two aforementioned magnetic fields are the same, differing only by a constant related to the casing attenuation factor. The magnetic field outside of the cased borehole is reduced in amplitude by an attenuation factor associated with the liner. Thus, the magnetic field produced at a point outside of the liner is a function of the product of term for the attenuation factor of the liner, $k_e$ and a term for the response of the geologic formation, $f$. Both terms are independent of the other. Thus, by factoring and removing information concerning the attenuation factor, $k_e$, accurate measurements of the geologic formation may be determined.

24 Claims, 6 Drawing Sheets

OTHER PUBLICATIONS

Wu & Habashy, "Influence of Steel Casings on Electromagnetic Signals," *Geophysics,* vol. 59, No. 3, pp. 378–390 (Mar. 1994).

Alumbaugh & Morrison, "Theoretical and Practical Considerations for Crosswell Electromagnetic Tomography Assuming a Cylindrical Geometry," *Geophysics,* vol. 60, No. 3, pp. 846–870 (May–Jun. 1995).

Wilt, Alumbaugh, Morrison, Becker, Lee & Deszcz–Pan, "Crosswell Electromagnetic Tomography: System Design Considerations and Field Results," *Geophysics,* vol. 60, No. 3, pp. 871–885 (May–Jun. 1995).

G. Newman, "Crosswell Electromagnetic Inversion using Integral and Differential Equations," *Geophysics,* vol. 60, No. 3, pp. 899–911 (May–Jun. 1995).

Torres–Verdin & Habashy, "An Approach to Nonlinear Inversion with Applications to Cross–Well EM Tomography," *Nonlinear EM Inversion* (1993).

Uchida, Lee & Milt, "Effect of a Steel Casing on Crosshole EM Measurement," *Society of Exploration Geophysicists, Expanded Abstracts with Biographies 1991 Technical Program,* vol. 1, $61^{st}$ Ann. Intl SEG Mtg., pp. 442–445 (Nov. 10–14, 1991/Houston).

* cited by examiner

METHOD AND APPARATUS FOR THE MEASUREMENT OF THE ELECTRICAL RESISTIVITY OF GEOLOGIC FORMATIONS EMPLOYING MODELING DATA

This invention claims priority to International Application No. PCT/US00/17695 filed on Jun. 28, 2000.

BACKGROUND OF THE INVENTION

Geologic formations defining a reservoir for the accumulation of hydrocarbons in the subsurface of the earth contain a network of interconnected paths in which fluids are disposed that ingress or egress from the reservoir. To determine the nature and behavior of the fluids in the aforementioned network, knowledge of both the nature of the pore fluids and the porosity of the geologic formations is desired. From this information, efficient development and management of hydrocarbon reservoirs may be achieved. For example, the resistivity of geologic formations is a function of both porosity of the formations and resistivity of the fluids. Considering that hydrocarbons are electrically insulative and most formation water contains salts, resistivity measurements are a valuable tool to determine the presence of hydrocarbon reservoirs in geologic formations and to monitor the changes in hydrocarbon content as production of the hydrocarbon proceeds.

To that end, there have been many prior art attempts to determine the electrical resistivity of geologic formations surrounding and between boreholes drilled into the geologic formations of interest. In two articles, *Crosshole electromagnetic tomography: A new technology for oil field characterization*, The Leading Edge, March 1995, by Wilt et al. and *Crosshole electromagnetic tomography: System design considerations and field results*, Society of Exploration Geophysics, Vol. 60, No. 3, 1995 by Wilt et al., measurement of geologic formation resistivity is described employing a low frequency electromagnetic (em) systems.

Figure 1:
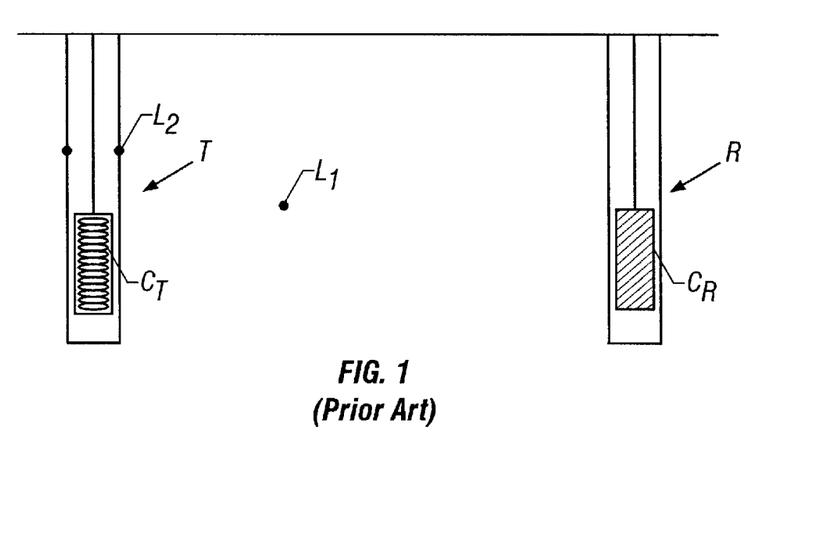
FIG. 1 is a simplified plan view of a prior art cross-well electromagnetic measurement system.

FIG. 1 shows the configuration of equipment used in the measurement of geologic formation resistivity between two boreholes. A transmitter, T, is located in one borehole and consists of a coil $C_T$ having multi-turn horizontal loop (vertical solenoid) of $N_T$ turns, having an effective cross section $A_T$. The multi-turn horizontal loop carries an alternating current, $I_T$, at a frequency of $f_0$ Hz. In free space this multi-turn horizontal loop produces a time varying magnetic field, $B_0$. The magnetic field, $B_0$, is proportional to the magnetic moment of the transmitter, $M_T$, and to a geometric factor, $k_1$. The magnetic moment of the transmitter $M_T$ is defined as follows:

$$M_T = N_T I_T A_T \tag{1}$$

The geometric factor, $k_1$, is a function of a spatial location and orientation of a field component of the magnetic field, $B_0$, measured by a receiver, R, with respect to the magnetic moment of the transmitter, $M_T$. The receiver is located spaced-apart from the transmitter, T, and typically disposed in a borehole in the earth. In free space, therefore, the magnetic field, $B_0$, is defined as follows:

$$B_0 = k_1 M_T \tag{2}$$

The receiver, R, typically includes a multi-turn loop of wire, i.e., a coil, $C_R$, having $N_R$ turns of wire, wound about a core of high permeability metal or ferrite. The changing magnetic field $B_R$, sensed by the receiver, R, with frequency $f_0$, creates an induced voltage $V_R$ in the coil which is proportional to, $B_R$; the frequency, $f_0$; the number of turns of wire, $N_R$; the effective cross-sectional area of the coil, $A_R$; and the effective permeability, $\mu_R$, of the core of coil $C_R$. From the foregoing, it is shown that $V_R$ is defined as follows:

$$V_R = f_0 B_R N_R A_R \mu_R \tag{3}$$

Simplifying equation (3) above, $V_R$ may be written as follows:

$$V_R = k_R B_R \tag{4}$$

where $k_R = f_0 N_R A_R \mu_R$. The product of $A_R \mu_R$ is difficult to calculate. To accurately determine $A_R \mu_R$, $C_R$ is calibrated in a known field, at a known frequency to find an exact value for $k_R$. Thereafter, the magnetic field, $B_R$ sensed by the receiver, R, is related directly to the measured voltage $V_R$ by the following:

$$B_R = V_R / k_R \tag{5}$$

Such sensors measure the magnetic field in the direction of the axis of the solenoid.

When this system is placed in a conducting geologic formation the time varying magnetic field, $B_0$, produces an electromotive force in the geologic formation, which in turn drives currents therein, shown schematically as $L_1$. The currents, $L_1$, are proportional to the conductivity of the geologic formation and are concentric about the longitudinal axis of the borehole. The magnetic field proximate to the borehole is a result of the free space field, $B_0$, called the primary magnetic field, and the field from the current $L_1$, called the secondary magnetic field. The sum of these fields is a vector and the described sensors thus measure a component of the vector field in the direction of the solenoidal axis. In the examples used in the description of this invention the components of the magnetic field along the axis of the bore hole are used. In the convention used here this is defined as the z axis. Other components may be used and indeed the referenced studies indicate that other components may be used to improve the resulting determination of the distribution of resistivity in the formation.

The current $L_1$ is typically out of phase with respect to the transmitter current $I_t$. At very low frequencies, where the inductive reactance of the surrounding formation is small, the induced current $L_1$, is proportional to $dB/dt$ and is consequently 90° out of phase with respect to $I_t$. As the frequency increases, the inductive reactance increases and the phase increases to be greater than 90°.

The secondary magnetic field at the receiver, R, is caused by the induced current and consequently also has a phase shift and so the total field is complex. The total measured field has a component, $B_R$, in-phase with the transmitter current $I_T$, (called the real component) and a component, $B_I$, phase shifted by 90° (called the imaginary or quadrature component). The values of the real, $B_R$, and quadrature components, $B_I$, of the magnetic field at a given frequency and geometrical configuration uniquely specify the electrical resistivity of a homogenous formation pierced by the drill holes. In an inhomogeneous geologic formation, the complex field is measured at a succession of points along the longitudinal axis of the receiver borehole for each of a succession of transmitter locations. The multiplicity of T–R locations suffices to determine the inhomogeneous resistivity between the holes as described in the papers above.

In general, the inhomogeneous distribution of electrical resistivity is determined through a process called inversion which is well described by *Audio-frequency electromagnetic tomography in 2-D*, Geophysics, Vol. 58, No. 4, 1993 by Zhou et al., *Electromagnetic conductivity imaging with an iterative born inversion*, IEEE Transactions on Geoscience and Remote Sensing, Vol. 31, No. 4, 1993 by Alumbaugh et al., *An approach to nonlinear inversion with applications to cross-well EM tomography* 63$^{rd}$ Annual International Meeting, Society of Exploration Geophysics, Expanded Abstracts, 1993 by Torres-Verdin et al., and *Crosswell electromagnetic inversion using integral and differential equations*, Geophysics, Vol. 60, No. 3, 1995 by Newman. This process has been well demonstrated for the determination of resistivity in the vicinity of a single borehole or between spaced-apart boreholes wells and is described in detail by *Crosswell electromagnetic tomography: System design considerations and field results*, Geophysics, Vol. 60, No. 3, 1995 by Wilt et al., *Theoretical and practical considerations for crosswell electromagnetic tomography assuming a cylindrical geometry*, Geophysics, Vol. 60, No. 3, by Alumbaugh and Wilt, and *3D EM imaging from a single borehole; a numerical feasibility study*, 1998 by Alumbaugh and Wilt.

In brief one embodiment of the inversion process consists in assigning resistivities to a multitude of cells or elements of the volume surrounding, or between, boreholes. The resistivities are systematically varied until, in a least squares sense, the results from the cellular model of the formation match the observed data taken with the field transmitter receiver system described herein. In another embodiment, a more specific model of the formation is assumed using geological, well log or other geophysical data The parameters of this model (e.g. resistivity distribution, shape, layer thickness, etc.) are varied until, again in a least squares sense, the numerical results from the model match the field results. In another embodiment direct images of the distribution of resistivity may be obtained following the principles of diffusion tomography as described by *Audiofrequency electromagnetic tomography in 2-D*. Geophysics, Vol. 58, No. 4, 1993 by Zhou et al. In yet another method multifrequency em data is transformed to a mathematically defined wave field domain and the data are processed following the procedures of seismic tomography. These means of interpreting the em data are included here to illustrate the fact that em methods are of practical use in determining the resistivity of geological formations.

The measurements are usually made before extraction of hydrocarbons takes place and during the extraction process. To that end, the system of FIG. 1 is principally directed to detecting hydrocarbon reservoirs and to monitoring the changes in reservoir resistivity as hydrocarbon is withdrawn in an uncased borehole. Boreholes are, however, typically cased with conductive liners (also called casings) in order to preserve the physical integrity of the borehole during subsequent hydrocarbon extraction. A problem exists in that the conductive liners are electrically conductive and are themselves inhomogenous and strongly attenuate the ac magnetic field introduced into the formation. They are very difficult and costly to remove from the borehole once installed. As a result, the system shown above in FIG. 1 does not facilitate analysis of a hydrocarbon reservoir once conductive liners are installed and extraction of the hydrocarbons begins.

The problems presented by conductive liners are described by Augustin et al., in *A Theoretical Study of Surface-To-Borehole Electromagnetic Logging in Cased Holes*, Geophysics Vol. 54, No. 1 (1989); Uchida et al., in *Effect of A Steel Casing on Crosshole EM Measurements*, SEG Annual Meeting, Texas (1991); and Wu et al. in *Influence of Steel Casing on Electromagnetic Signals*, Geophysics, Vol. 59, No. 3 (1994). From these papers, it is seen that the conductivity may be modeled as an additional shorted wire closely coupled to the transmitter T, shown schematically as $L_2$ in FIG. 1.

The net or effective magnetic moment, $M_{eff}$, of the transmitter, T, conductive liner combination is dictated by the inductive coupling therebetween. Physically, the resistivity of the conductive liner is very low and the inductance relatively high. This results in a current being induced in the conductive liner that is approximately 180° out of phase of the transmitter current $I_T$, i.e., the induced current is of opposite polarity to the transmitter current, $I_T$, but almost of the same moment. In this manner, the magnetic field external to the conductive liner is greatly reduced. In effect, the conductive liner "shields" the transmitter, T, from the receiver, R, positioned outside of the conductive liner. The external field is produced by the difference in current, and hence moment, in the transmitter and conductive liner.

Since the induced moment in the liner is large, and nearly equal to the transmitter moment, small changes in the properties of the liner produce large fractional changes in the net of effective moment In practice, liners are known to be inhomogenous: there are variations in liner radius, thickness, permeability, and conductivity caused either by manufacturing/processing procedures or by corrosion/stress/temperature processes after installation. The central problems for the em methods described above for noncased, or open, well surveys is that the fields from the transmitter are severely attenuated in a cased well and that the net moment is highly variable as the transmitter traverses the length of the well. Without knowing the casing properties very precisely, it is difficult to distinguish between external field variations caused by the liner and the formation.

Figure 2:
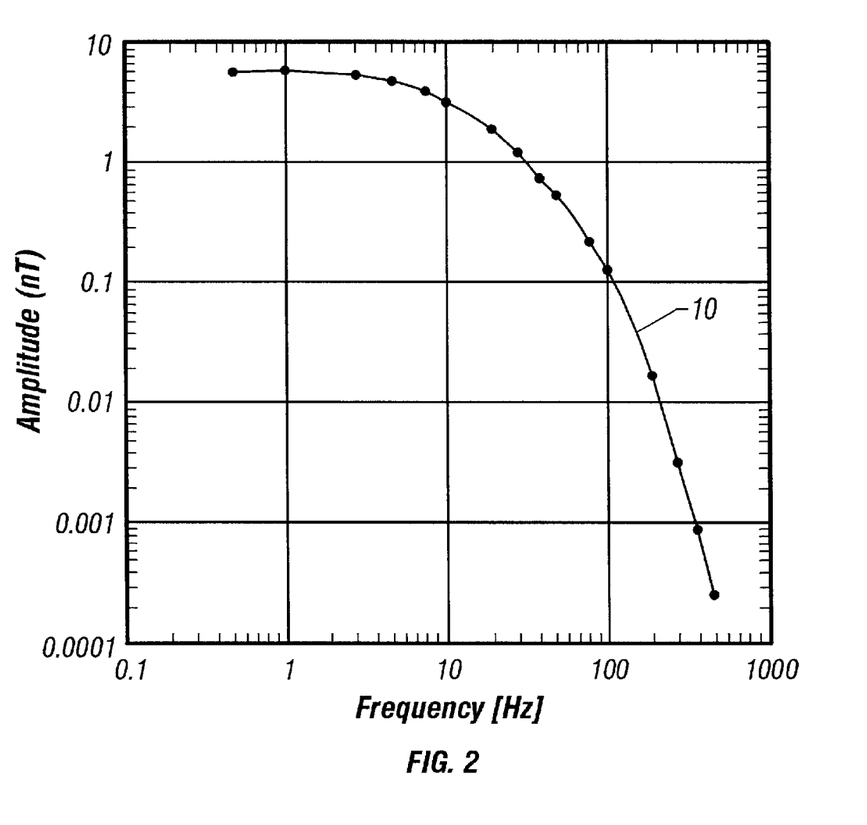
FIG. 2 is a graphical representation of a magnetic field sensed with a receiver disposed in a borehole that has been cased with a conductive liner.

An analogous situation affects a magnetic field sensor within a cased borehole. The field to be detected induces currents concentric with the receiver coil whose sense is such as to reduce the field within the liner. The field to be detected is consequently highly attenuated and the measurement is highly influenced by the variations in attenuation caused by the variation in liner properties, an example of which is graphically demonstrated by the slope of curve 10 shown in FIG. 2. Often, the design criteria for a crosshole survey of a cased borehole reduces the signal to a level that is undetectable by standard receivers. Moreover, the variance in conductivity, permeability, and thickness along a longitudinal axis of a liner makes difficult determining the attenuation factor at any given point. This has been said to cause errors in the field measurements that are not easily corrected.

One prior art attempt to overcome this problem involved inclusion of a separate small-scale transmitter-receiver within the cased borehole to accurately measure the casing properties. The measured casing properties would then be used to correct the measured crosshole data. Lee, K. H. Kim, H. J., and Song, Yoonho, 1998. Lawrence Berkeley National Laboratory Report Number LBNL-41525.

Another prior art attempt to correct for the attenuation of a liner involved positioning of a monitor receiver adjacent to the transmitter in the cased borehole. In this manner, an attempt is made to predict the attenuation sensed by the external receiver.

A drawback with the aforementioned prior art attempts to correct for the attenuation factor concerns the implementation of auxiliary transmitters or receivers which increases the cost of a system and its complexity. Further, there is limited empirical evidence to suggest that the added cost and complexity of these systems is justified. It is not yet known whether these systems may accurately correct for the attenuation factor.

What is needed, therefore, is a cross-well measurement technique that provides accurate measurements of geologic formations without requiring detailed information concerning the properties of a liner casing the same and that is compatible with inversion methods used to interpret measurements obtained from non-cased boreholes.

SUMMARY OF THE INVENTION

Provided are a method, a computer program product and a system, to measure characteristics of geologic formations, such as hydrocarbon reservoirs, that employs modeling data to remove unwanted information from a signal carrying information concerning the geologic formation. This allows obtaining accurate information concerning the resistivity of geologic formations in which a borehole has been formed and encased with a conductive liner, such as a steel casing. Specifically, it was recognized that a magnetic field produced from a dipole transmitter within a borehole that has been cased is substantially similar to magnetic fields produced from a dipole transmitter in an uncased borehole, i.e., the spatial distribution and orientation to the two aforementioned magnetic fields are the same, only the amplitudes and phase differ. The magnetic field outside of the cased borehole is reduced in amplitude by an attenuation factor $k_c$ associated with the liner. Thus, the magnetic field produced at a point outside of the casing is a function of the product of term for the attenuation factor of the casing, $k_c$, and a term for the response of the geologic formation, $k_f$. Both terms are independent of the other. By factoring and removing information concerning the attenuation factor, $k_c$, accurate measurements of the geologic formation may be determined.

To that end the invention herein includes a system having a transmitter disposed within a first area of the geologic formation and a signal generator in data communication with the transmitter. A receiver is disposed in a second area of the formation and a processor is in data communication with the receiver. With this system, a method for determining the electrical resistivity of the formation is practiced that includes producing, within a first area of the geologic formation, a first magnetic field and sensing, within a second area of the geologic formation, a second magnetic field. The second magnetic field in the second area is a function of the first magnetic field. The second area is spaced-apart from the first area The second area is surrounded with an electrically conductive casing. Associated with the casing is an attenuation factor. A signal is formed that corresponds to the second magnetic field sensed by the receiver. The signal includes information corresponding to the attenuation factor $k_c$. A modeled magnetic field is calculated. The modeled magnetic field corresponds to the second magnetic field in an absence of the electrically conductive casing and defines a modeled representation. A quantitative value of the attenuation factor is obtained by dividing the signal by the modeled representation, and the information is removed from the signal by dividing the same with the quantitative value, thereby forming a corrected signal. The characteristics of the geologic formation are measured as a function of the corrected signal.

Alternatively, reformulating the inversion programs can explicitly solve for the casing factors at the second magnetic field positions. The key property allowing these factors to be solved is that at each second magnetic field position, the casing factor will be the same for any first magnetic field position, except for the case when the two positions are very close. Thus, the casing factor may be obtained independent of the formation factor.

Typically, a plurality of magnetic fields is sensed in the second area. This may be achieved with a single receiver disposed in the borehole formed in the second area of the geologic formation. The receiver is then moved along a longitudinal axis of the borehole. Alternatively, an array of spaced-apart receivers may be disposed in the borehole, with the receivers being spaced-apart along the aforementioned longitudinal axis. In this manner, a plurality of additional second magnetic fields is sensed. A measurement profile of the geologic formation may be generated from the plurality of additional second magnetic fields. To remove information concerning the attenuation factor, an additional signal for each of the additional second magnetic fields is formed and divided by the quantitative value. Thus, a plurality of additional corrected signals are generated and the characteristics of the geologic formation are measured as a function of both the plurality of additional corrected signals and the corrected signal.

Were an additional borehole present, e.g., formed into the first area, then a measurement profile may be obtained for differing points of the transmitter in the first area To that end, a transmitter may be sequentially located at different points along the longitudinal axis of additional borehole. Alternatively, an array of transmitters may be disposed within the borehole. At each of the aforementioned points, a plurality of additional second magnetic fields is sensed and a corresponding signal generated. In this manner, a plurality of measurement profiles are formed. The information contained in the signal concerning the attenuation factor may be removed as discussed above.

These and other embodiments of the present invention along with many of its advantages and features are described in more detail in conjunction with the text below and attached figures.

DESCRIPTION OF THE SPECIFIC EMBODIMENTS

Figure 3:
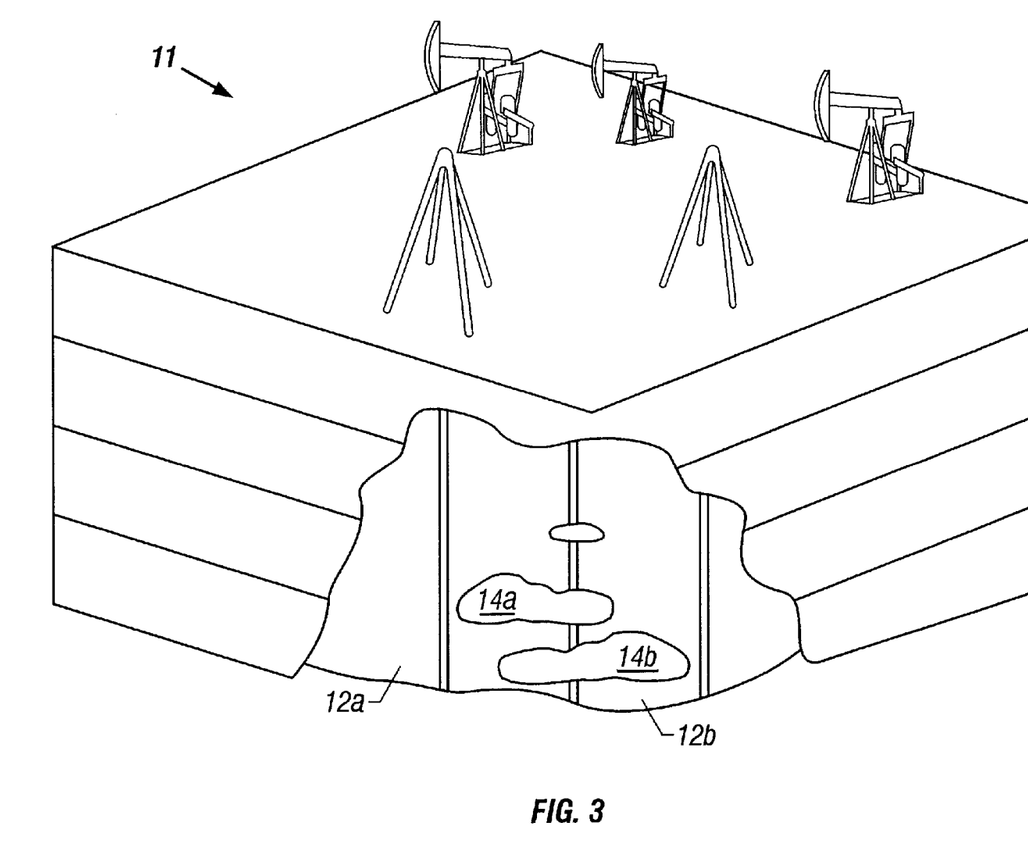
FIG. 3 is a perspective view of a geologic formation undergoing crosswell electromagnetic analysis.

Referring to FIG. 3, a geologic formation 11 under analysis includes one or more boreholes, shown generally as 12a and 12b and a reservoir of resources of interests, in this example one or more reservoirs of hydrocarbons, shown generally as 14a and 14b. Typically, at least one of the boreholes 12a and 12b is cased with a conductive liner 16a and 16b, shown more clearly in FIG. 4. A system 19 employed to analyze the geologic formation includes a transmitter 20 disposed within borehole 12a, a first region of the geologic formation. In signal communication with the transmitter 20 is a signal generator included in surface station 22. A receiver 24 is disposed in the borehole 12b. The transmitter 20 and receiver 24 are deployed using standard seven conductor wireline winches, cables and standard seven- pin Gerhardt-Owens cable connectors, shown generally as 26. The system 19 is operated using a computer (not shown), included in surface station 28 that is in data communication with the transmitter 20 and receiver 24. The computer (not shown) includes a processor (not shown) and memory (not shown) that stores programs necessary to operate the system 19.

Figure 4:
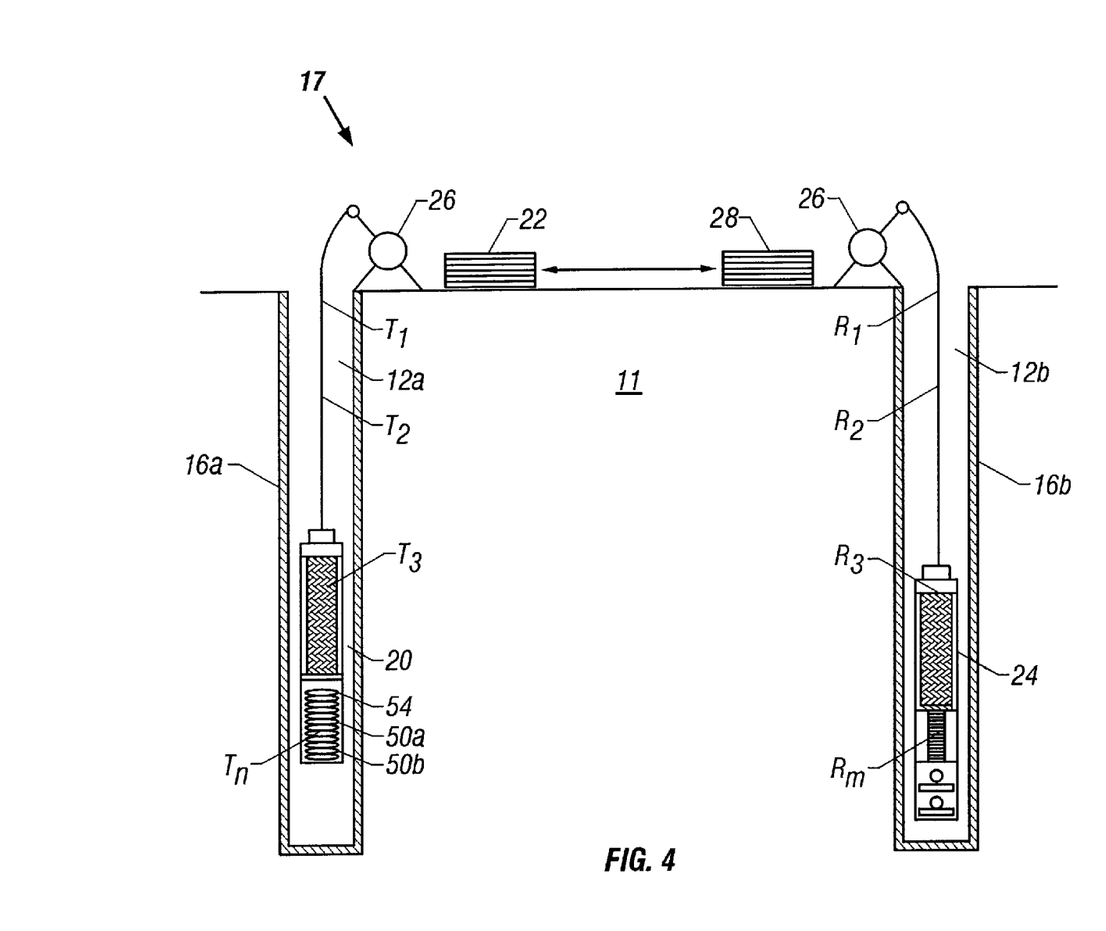
FIG. 4 is a simplified plan view of a cross-well electromagnetic measurement system in accordance with the present invention.

Typically, magnetic fields are generated by the transmitter 20 at various vertical levels above, within, and below an area of interest. The magnetic fields sensed by the receiver 24 are sensed at various vertical levels above, within, and below the area of interest. In an exemplary embodiment, the transmitter 20 is placed in an uncased borehole and traversed between fixed depth points at a rate of 3 to 5 meters/minute. The receiver remains at a fixed position in a cased borehole. After the transmitter 20 moves between the aforementioned fixed depth points, the receiver was positioned at a different position within the lined borehole and again the transmitter 20 traverses between the fixed depth points. However, for the reasons discussed above, the liner has an adverse affect on the measurements made. To overcome the effects of the liner, a model of the formation is used to calculate the magnetic field sensed by the receiver 24 which corresponds to information that would be contained in the same without the presence of the electrically conductive liner. From this modeled representation, a first approximation of the casing information contained in the magnetic field sensed by the receiver 24 may be identified and removed. The corrected data is then used to determine a new model for the formation resistivity and the process is repeated several times. Each time the casing information is more accurately removed and the formation response more accurately recovered.

A specific example illustrates the modeling method of attenuating, if not removing, the casing effects. Consider that conductive liner 16a is not present and borehole 12b was cased, i.e., conductive liner 16b is present. The transmitter 20 is located at a plurality of positions, $T_i$, in the borehole 12a, at depths of $i\Delta_x$, where $\Delta_x$, is the interval between successive positions of the transmitter 20. At each position, $T_i$, the receiver 24 would sense the magnetic field, in this example the field in the direction of the borehole axis Bz, within borehole 12b at a series of spaced-apart positions $R_j$, at depths of $j\Delta_x$ where $\Delta_x$ as described above. Thus, the magnetic field measured in borehole 12b, $Bz_{i,j}$, is a function of the position of the receiver 24 at depths $j\Delta_x$ and the position of the transmitter at depths $i\Delta_x$; the subscript i refers to the position of the transmitter and j to the receiver. At any receiver position, $R_j$, the magnetic field is not accurately known because of unknown variations in the nominal values of the dimensions and properties of the casing 16b at that location. Let the attenuation caused by the casing at $j\Delta_x$ be represented by $C_j e^{i\phi_j}$. This is standard complex notation for the fact that the amplitude of the field is attenuated by the factor $C_j$ and the phase is rotated by $\phi_j$.(Note that the i preceding the $\phi_j$ is the imaginary numbers $\sqrt{-1}$ not the index of the receiver position). Considering for example that the borehole 12b is cased, any magnetic fields sensed by the receiver 24, $Bz_{i,j}$, for a given position of the transmitter 20, $T_i$, may thus be determined as follows:

$$Bz_{i,j} = C_j e^{i\phi_j} M_i f_{i,j}(\rho,\omega) \quad (6)$$

where $M_i$, is the moment of the transmitter 20, $f_{i,j}(\rho\omega)$ is the desired formation response which is a function of the resistivity $\rho$, the frequency $\omega$ and which includes the known geometric factor for that transmitter-receiver geometry. The field in equation (6) is the observed field from which the desired formation response must be recovered.

The essence of the present invention is that an initial estimate of the formation is made and an estimated field is calculated in the absence of the casing attenuation using equation (6). This is referred to as the modeled field or the simulated field and it is written as follows:

$$Bz_{i,j\ mod} = M_i f_{i,j}(\rho\omega) \quad (7)$$

This model field is usually calculated from a one dimensional (1-D) layered model which, typically, substantially corresponds to the known resistivity of the geologic formation as determined employing standard resistivity or induction logs at the time the borehole was drilled, i.e., before the borehole is cased. Absent this information an educated guess as to the formation resistivity based on the known or anticipated geology could be used. From the foregoing it is seen that the determination of the information corresponding to the casing properties requires dividing equation (6) by equation (7) to obtain $C_j e^{i\phi_j}$. Any one of the many transmitter- receiver pairs may be used in this process to determine a first estimate of the complex casing factor. The observed fields for all the transmitter positions for a specific receiver are then divided by $C_j e^{i\phi_j}$ to yield a new set of magnetic field signals, called a profile, representing information corresponding to the geologic formation of interest without information associated with the attenuation factor. The process is repeated for each receiver position until a complete set of corrected data signals has been obtained for all possible receiver- transmitter pairs. Usually, the receiver 24 is moved between 25 and 50 different positions within the borehole 12b, with the transmitter producing a magnetic field at an equal number of points within borehole 12a.

To minimize the discrepancy between the modeled magnetic field and the magnetic field it the represents, the attenuation factor $C_k e^{i\phi_k}$, for any given profile from a receiver $R_k$ corresponds to the position of the receiver 24 that is located adjacent to a point where the transmitter 20 is located. Generally this means the points where the transmitter and receiver are at the same level. Determining $C_k e^{i\phi_k}$ in this manner ensures that the magnetic field associated therewith depends strongly on the conductivity of the horizontal region of the geologic formation disposed between the transmitter 20 and the receiver 24 and is relatively insensitive to the conductivity above and below this region.

Figure 5:
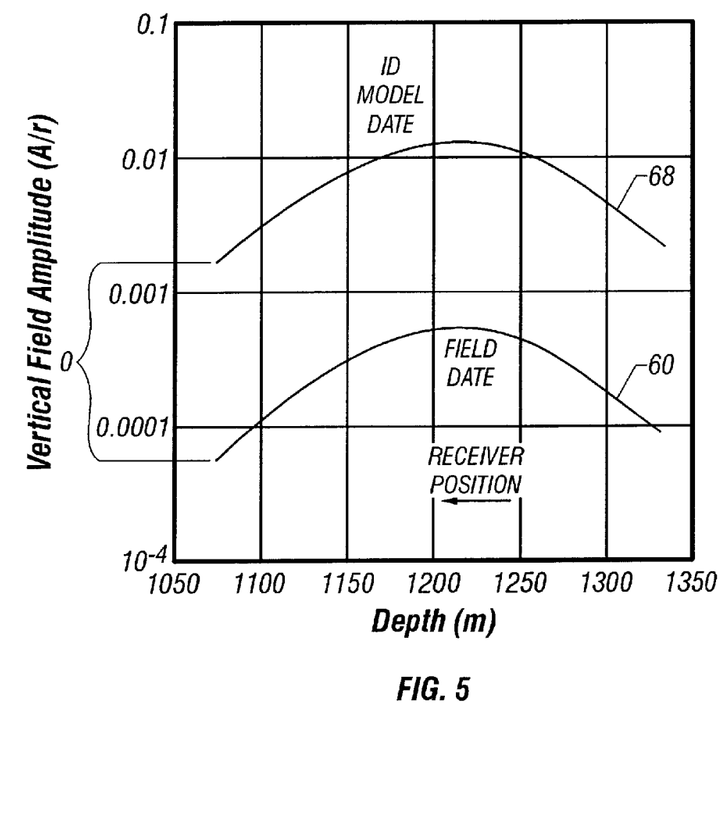
FIG. 5 is a graphical representation of amplitude information of a measured magnetic field compared with the amplitude information of a modeled magnetic field.
Figure 6:
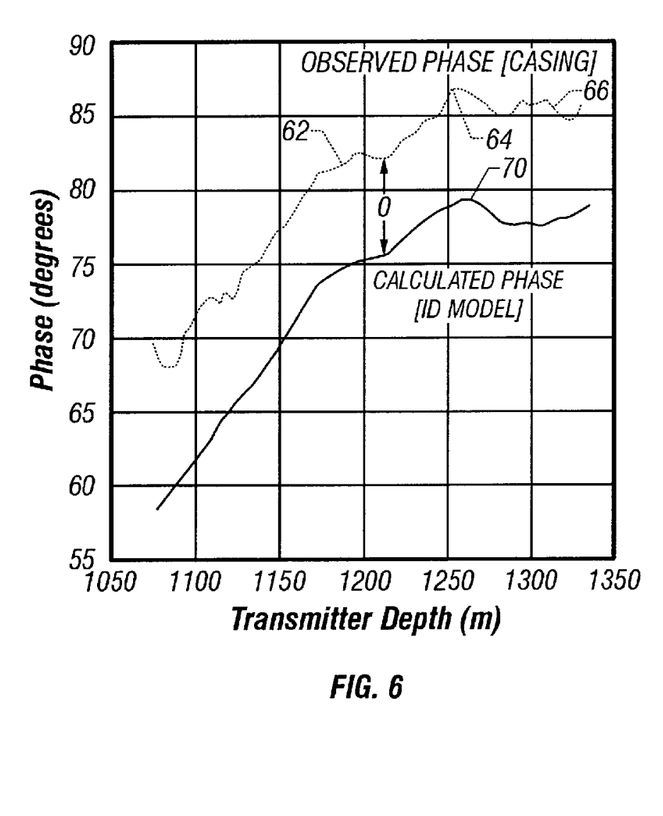
FIG. 6 is a graphical representation showing a comparison of phase information of the measured and modeled magnetic fields shown above in FIG. 5.

Specifically the means for correcting the observed data for the casing effect may be further illustrated with actual data taken in a borehole survey, as shown in FIGS. 5 and 6. The curve 60 is a plot of the observed amplitude of the field at a receiver at about 1230 m (indicated by the small arrow on the horizontal depth scale) as the transmitter is moved from a depth of 1070 m to a depth of 1330 m in the adjacent borehole The profile has an arcuate shape with a peak corresponding to positions where the distance between the transmitter 20 and the receiver 24 is minimized. The measured phase is plotted as curve 62 in FIG. 6. The shape of curve 62 more directly reflects variations in the resistivity of the geologic formation of interest. For example, the phase peaks 64 and 66 correspond to points where the transmitter is located in high resistivity oil sands.

Curves 68 and 70 represent 1-D layered modeled amplitude and phase data, respectively. The modeled amplitude and phase data were calculated based upon the induction resistivity logs collected in the same boreholes before the casing was installed. The offset "O" between curve 60 and 68 represents the attenuation, C, caused by the casing in the receiver well at that position of the receiver, and the offset, O', between curve 62 and 70 represents the phase shift, φ, caused by the casing, referred to here as the static offsets. The offset varies with the properties of the conductive liner, and the quantitative value of the static shift is unknown.

Figure 7:
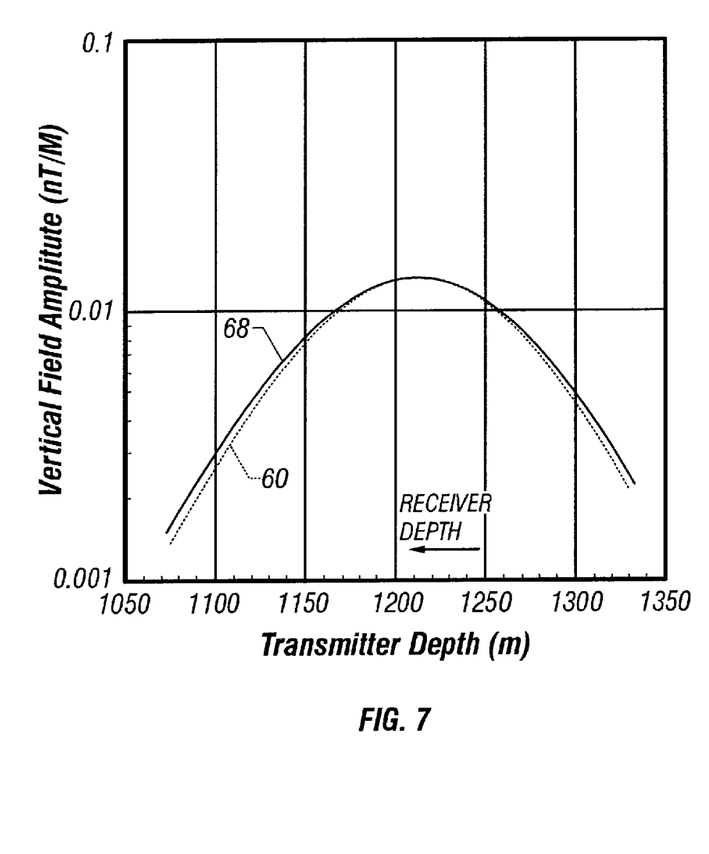
FIG. 7 is a graphical representation showing a comparison of amplitude information of the measured and modeled magnetic fields shown above in FIG. 5 after correction to remove information corresponding to an attenuation factor introduced by a conductive liner shown above in FIG. 4.
Figure 8:
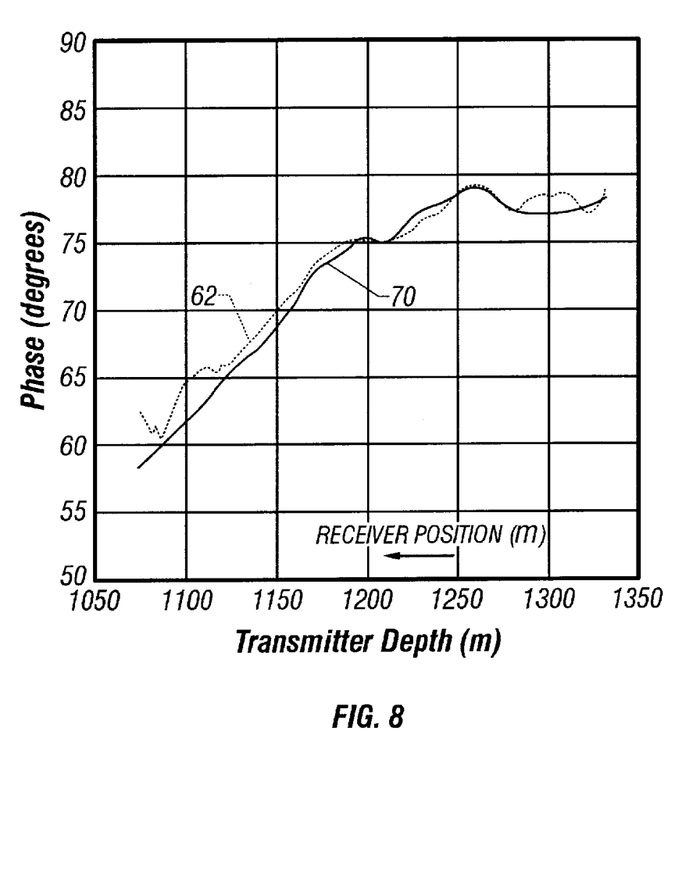
FIG. 8 is a graphical representation showing a comparison of corrected phase information of the measured and modeled magnetic fields shown above in FIG. 7.

To reduce the static offset, the attenuation factor $C_k e^{i\phi_k}$ by which each of the measured magnetic fields are divided is derived from a modeled magnetic field at a position where the transmitter 20 and receiver 24 are adjacent i.e., at the same depth within the respective borehole. In this example this position occurs at the peak of the curves at about 1220 m. Dividing the observed amplitudes through by C and subtracting the phase offset O' produces two corrected curves which are plotted as curve 60 and 70 in FIGS. 7 an 8. The curves 60 and 68 roughly coincide, as do curves 66 and 70, except at the farthest offsets. The difference between the curves is due to geological complexity not corrected employing the 1-D layered model. After obtaining data for all the desired profiles, a standard inversion algorithm is applied to obtain either a new 1-D section or to a 2-D resistivity distribution.

Were it desired to farther reduce the differences between the modeled profile and the measured profile, additional iterations of the correction procedure may be employed. In this manner, additional attenuation factors $C_k e^{i\phi_k}$ may be derived, not from data based upon the original modeled amplitude and phase data, but from a corrected profile based on the modeled formation resistivity obtained from the interpretation or inversion of the first corrected data. The model is updated after each iteration of the inversion algorithm. This creates a new data set of profiles in which static offsets are further reduced. In numerical simulations of this whole process it was found that two iterations are sufficient to achieve a desired reduction in the effect of the liner. With this procedure, the attenuation factor introduced by the liner is substantially reduced, if not removed. Again, as stated above, an attenuation factor $C_k e^{i\phi_k}$ from any of the transmitter- receiver pairs may be employed, but typically, the attenuation factor that is associated with the magnetic field sensed by the receiver 24 located at a position adjacent to the point the transmitter 20 is located is chosen.

Alternatively, the inversion codes for determining the formation conductivity could also be modified to explicitly solve for the casing attenuation factors at each receiver position. The staring values for the casing parameters could be calculated from estimates of the thickness, magnetic susceptibility and conductivity of the steel casing using programs such as developed by Song, Y. and Lee. K. H., 1998, *Electromagnetic Fields Due to a Loop Current in a Cased Borehole Surrounded by a Uniform Whole Space*, Lawrence Berkeley National Laboratory Report Number 42371.

Figure 9:
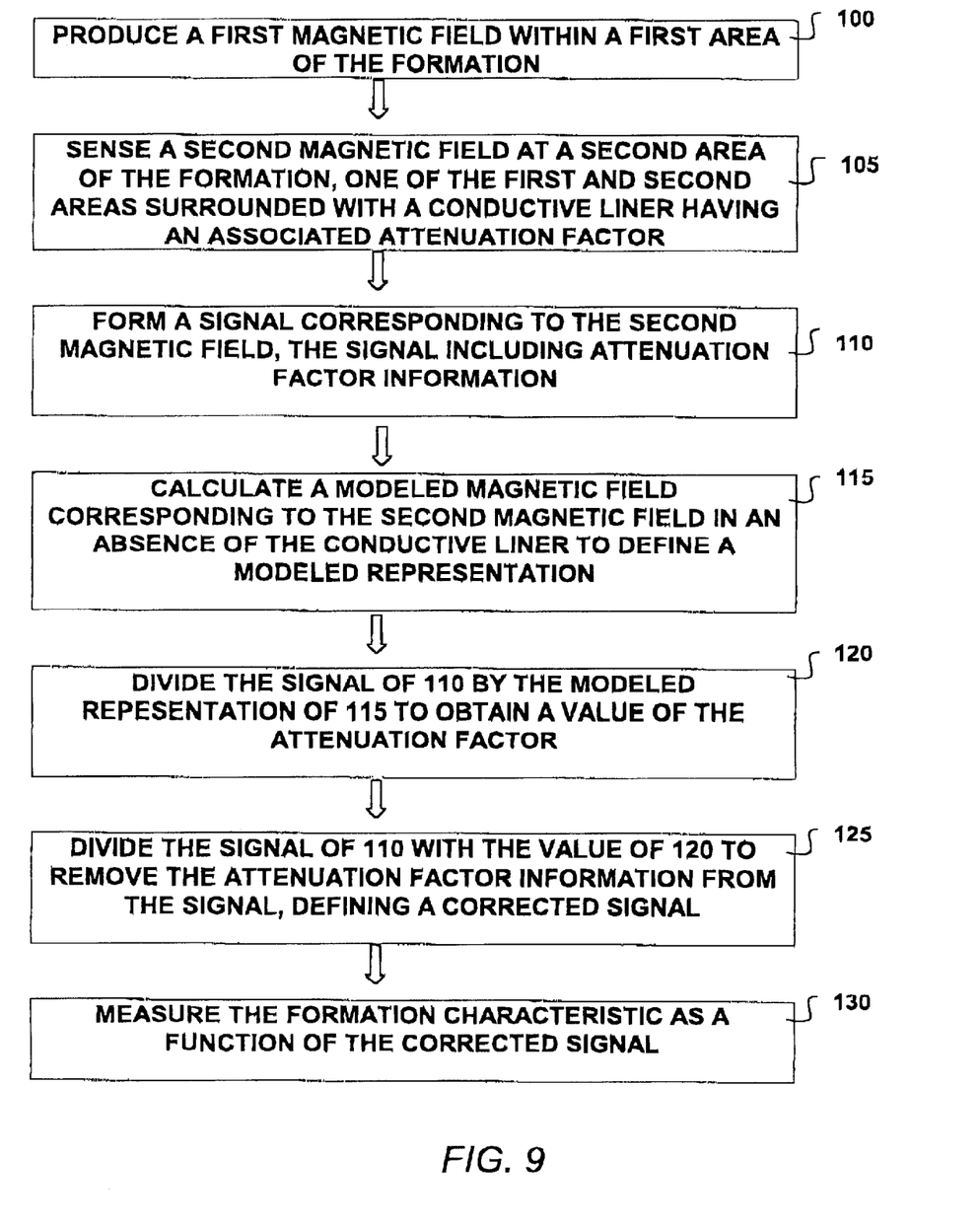
FIG. 9 is a flow diagram of a computer program for measuring formation characteristics in accordance with the present invention.

FIG. 9 illustrates a flow diagram of an algorithm that may be implemented via a computer program for measuring formation characteristics in accord with the invention, The process begins by producing a first magnetic field within a first area of the geologic formation at 100. At 105, a second magnetic field is sensed within a second area of the geologic formation, with the second area being spaced-apart from the first area and with one of the first and second areas being surrounded with an electrically conductive liner, the liner having an attenuation factor associated therewith. A signal corresponding to the second magnetic field is formed at 110, with the signal including information corresponding to the attenuation factor. At 115, a modeled magnetic field corresponding to the second magnetic field in an absence of the electrically conductive liner is calculated, defining a modeled representation, A quantitative value of the attenuation fact or is then obtained at 120 by dividing the signal of 110 by the modeled representation of 115. At 125, the information of 110 is removed from the signal by dividing the signal with the quantitative value of 120, defining a corrected signal. The formation characteristics are then measured as a function of the corrected signal at 130.

The foregoing has been discussed with respect to a dual borehole system in which a borehole is cased with the receiver positioned therein. It should be understood, however, that the present invention may be employed in a dual borehole system where both boreholes are cased. Further, the foregoing discussion has involved finding an attenuation factor from measurements taken with the transmitter and receiver as disposed adjacent to each other at a common vertical position within two spaced-apart boreholes. However, the attenuation factor may be obtained from measurements made with the relative positions of the transmitter and receiver being at differing vertical positions within spaced-apart boreholes or within a common borehole. As a result the present invention would work equally well in a single borehole system, where the transmitter sits atop of the surface of the geologic formation and the receiver is disposed in a single borehole, or conversely where the receivers (electric or magnetic field sensors) are disposed on the surface and the transmitter is disposed inside the borehole. The scope of the invention should, therefore, be determined not with reference to the above description, but instead should be determined with reference to the appended claims along with their fall scope of equivalents.

What is claimed is:

1. A method for measuring characteristics of a geologic formation, said method comprising:

producing, within a first area or said geologic formation, a first magnetic field;

sensing, within a second area of said geologic formation, a second magnetic field, with said second area being spaced-apart from said first area, with said first and second magnetic field being produced with one of said first and second areas being surrounded with an electrically conductive liner, said liner having an attenuation factor associated therewith;

forming a signal corresponding to said second magnetic field, said signal including information corresponding to said attenuation factor;

calculating a modeled magnetic field corresponding to said second magnetic field in an absence of said electrically conductive liner, defining a modeled representation;

obtaining a quantitative value of said attenuation factor by dividing said signal by said modeled representation, removing said information from said signal by dividing said signal with said quantitative value, defining a corrected signal; and measuring said characteristics as a function of said corrected signal.

2. The method as recited in claim 1 further including sensing within said second area a plurality of additional magnetic fields, each of which has an additional signal associated therewith that includes said information, and removing said information by dividing said additional signal with said quantitative value, thereby forming a plurality of additional corrected signals, wherein said characteristics are measured as a function of both said plurality of additional corrected signals and said corrected signal.

3. The method as recited in claim 1 wherein sensing within said second area is repeated multiple times at differing distances from said first area producing a plurality of additional magnetic fields, each of which has an additional signal associated therewith that includes said information, and removing said information by dividing said additional signal with said qualitative value, thereby forming a plurality of additional corrected signals, wherein said characteristics are measured as a function of both said plurality of additional corrected signals and said corrected signal.

4. The method as recited in claim 3 wherein each of said plurality of additional magnetic fields is associated with one of said plurality of distances, with the distance associated with said second magnetic field corresponding to one of said plurality of distances, with said one of said plurality of distances having a magnitude that is less than the remaining distances of said plurality of distances.

5. The method as recited in claim 1 wherein producing within said first area is repeated multiple times at differing points along a second direction, extending transversely to said first direction, producing a plurality of additive magnetic fields, and sensing within said second area is repeated multiple times, for each of said plurality of additive magnetic fields, at differing distances from said each of said plurality of additive magnetic fields, producing a plurality of additional magnetic fields, each of which is associated with an additional signal that includes said information, and removing said information by dividing said additional signal with said qualitative value, thereby forming a plurality of additional corrected signals, wherein said characteristics are measured as a function of both said plurality of additional corrected signals and said corrected signal.

6. The method as recited in claim 5 wherein each of said plurality of additional magnetic fields is associated with one of said plurality of distances, with the distance associated with said second magnetic field corresponding to one of said plurality of distances, with said one of said plurality of distances having a magnitude that is less than the remaining distances of said plurality of distances.

7. The method as recited in claim 1 wherein said modeled magnetic field is a one-dimensional model of said second magnetic field.

8. The method as recited in claim 1 wherein said modeled magnetic field is a multi-dimensional model of said second magnetic field.

9. The method as recited in claim 2 wherein said second magnetic field and said plurality of additional magnetic fields are produced concurrently.

10. A computer program product for measuring characteristics of a geologic formation, said method comprising:
   code to produce, within a first area of said geologic formation, a first magnetic field;
   code to sense, within a second area of said geologic formation, a second magnetic field, with said second area being spaced-apart from said first area, with one of said first and second areas being surrounded with all electrically conductive liner, said liner having an attenuation factor associated therewith;
   code to form a signal corresponding to said second magnetic field, with said signal including information corresponding to said attenuation factor;
   code to calculate a modeled magnetic field corresponding to said second magnetic field in an absence of said electrically conductive liner, defining a modeled representation;
   code to obtain a quantitative value of said attenuation factor by dividing said signal by said modeled representation;
   code to remove said information from said signal by dividing said signal with said quantitative value, defining a corrected signal; and
   code to measure said characteristics as a function of said corrected signal.

11. The computer program product as recited in claim 10 wherein said code to sense within said second area further includes a subroutine to sense a plurality of additional magnetic fields, each of which has an additional signal corresponding thereto that includes said information, and code to remove said information by dividing said additional signal by said quantitative value, thereby forming a plurality of additional corrected signals, wherein said characteristics are measured as a function of both said plurality of additional corrected signals and said corrected signal.

12. The computer program product as recited in claim 10 whereunto said code to sense within said second area further includes a subroutine to sequentially sense a plurality of additional magnetic fields within said second area differing distances from said first magnetic field, with each of said plurality of additional magnetic fields having an additional signal corresponding thereto that includes said information, and code to remove said information by dividing said additional signal by said qualitative value, thereby forming a plurality of additional corrected signals, wherein said characteristics are measured as a function of both said plurality of additional corrected signals and said corrected signal.

13. The computer program product as recited in claim 12 wherein each of said plurality of additional magnetic fields is associated with one of said plurality of distances, with the distance associated with said second magnetic field corresponding to one of said plurality of distances, with said one of said plurality of distances having a magnitude that is less than the remaining distances of said plurality of distances.

14. The computer program product as recited in claim 10 wherein said first and second areas are spaced-apart along a first direction, with said code to produce within said first area further including a first subroutine to produce a plurality of additive magnetic fields at differing points along a second direction, extending transversely to said first direction, and said code to sense within said second area includes a second subroutine to sense, for each of said plurality of additive magnetic fields, a plurality or additional magnetic fields at differing distances from said each of said plurality of additive magnetic fields, with each of said plurality of additional magnetic fields having an additional signal corresponding thereto that includes said information, and code to remove said information by dividing said additional signal with said qualitative value, thereby forming a plurality of additional corrected signals, wherein said characteristics are measured as a function of both said plurality of additional corrected signals and said corrected signal.

15. The computer program product as recited in claim 14 wherein each of said plurality of additional magnetic fields is associated with one of said plurality of distances, with the distance associated with said second magnetic field corresponding to one of said plurality of distances, with said one of said plurality of distances having a magnitude that is less than the remaining distances of said plurality of distances.

16. The computer program product as recited in claim 10 wherein said modeled magnetic field is a one-dimensional model of said second magnetic field.

17. The computer program product as recited in claim 10 wherein said modeled magnetic field is a multidimensional model of said second magnetic field.

18. The computer program product as recited in claim 11 wherein said second magnetic fields and said plurality of additional magnetic fields are sensed concurrently.

19. A system for measuring characteristics of a geologic formation disposed between first and second spaced-apart areas, one of which surrounded with an electrically conductive liner, said system comprising:

a transmitting unit disposed within said first area;

a signal generator in data communication with said transmitting unit;

a receiving unit disposed in said second area;

a processor in data communication with both said transmitting unit and said receiving unit; and a memory in data communication with said processor, said memory including code to produce, within a first area of said geologic formation, a first magnetic field; code to sense, within a second area of said geologic formation, a second magnetic field; code to form a signal corresponding to said second magnetic field, with said signal including information corresponding to said attenuation factor; code to calculate a modeled magnetic field corresponding to said second magnetic field in an absence of said electrically conductive liner, defining a modeled representation; code to obtain a quantitative value of said attenuation factor by dividing said signal by said modeled representation; code to remove said information from said signal by dividing said signal with said quantitative value, defining a corrected signal; and code to measure said characteristics as a function of said corrected signals.

20. The computer program product as recited in claim 10 wherein said first and second areas are spaced-apart along a first direction, with said code to produce within said first area further including a first subroutine to produce a plurality of additive magnetic fields at differing points along a second direction, extending transversely to said first direction, and said code to sense within said second area includes a second subroutine to produce, for each of said plurality of additive magnetic fields, a plurality of additional magnetic fields at differing distances from said each of said plurality of additive magnetic fields, with each of said plurality of additional magnetic fields having an additional signal corresponding thereto that includes said information, and code to remove said information by said additional signal with said qualitative value, thereby forming a plurality of additional corrected signals, wherein said characteristics are measured as a function of both said plurality of additional corrected signals and said corrected signal.

21. The system as recited in claim 19 wherein said receiving unit includes a multi-turn wire wound about a metal core.

22. The system as recited in claim 19 wherein said receiving unit includes a plurality of receivers, each of which has a multi-turn wire wound about a metal core.

23. The system as recited in claim 19 wherein said transmitting unit includes a multi-turn wire to produce a time varying magnetic field in response to signals from said signal generator.

24. The system as recited in claim 19 wherein said transmitting unit includes a plurality of transmitters, each of which has a multi-turn wire wound about a metal core.

* * * * *